US006253506B1

(12) United States Patent
Hahn

(10) Patent No.: US 6,253,506 B1
(45) Date of Patent: Jul. 3, 2001

(54) MOTOR-VEHICLE WINDOW WITH A STRUCTURED SURFACE IN THE PERIPHERAL REGION

(75) Inventor: Dieter Hahn, Übach-Palenberg (DE)

(73) Assignee: Saint-Gobain Vitrage (FR)

( * ) Notice: Subject to any disclaimer, the term of this patent is extended or adjusted under 35 U.S.C. 154(b) by 0 days.

(21) Appl. No.: 09/335,874

(22) Filed: Jun. 18, 1999

(30) Foreign Application Priority Data

Jun. 18, 1998 (DE) ............................................... 198 27 076

(51) Int. Cl.⁷ ...................................................... E06B 3/00
(52) U.S. Cl. ...................... 52/204.5; 52/204.5; 52/746.1; 296/146.1
(58) Field of Search ..................... ; 296/746.1; 52/204.5; C03C 17/34

(56) References Cited

FOREIGN PATENT DOCUMENTS

| 34 35 469 | 4/1985 | (DE) . |
| 43 31 790 | 2/1996 | (DE) . |
| 0299672 | * 7/1988 | (EP) ............................... C03C/17/34 |

* cited by examiner

Primary Examiner—Beth A. Stephan
Assistant Examiner—Chi Nguyen
(74) Attorney, Agent, or Firm—Pennie & Edmonds LLP

(57) ABSTRACT

The invention relates to a motor-vehicle window (1) provided with a peripheral region which engages, at leas in places, with a sealing element (4). The motor-vehicle window (1) can be fitted both in a fixed manner and in a moveable or sliding manner. The surface of the motor-vehicle window (1) is provided, at least in the peripheral region of contact with the sealing element (4), with a structurization (2) which produces a large number of locally delimited areas of contact between the sealing element (4) and the motor-vehicle window (1). In this way, excessively high adhesion forces, with the occurrence of noise during a relative movement between the window (1) and the sealing element (4), are avoided.

10 Claims, 2 Drawing Sheets

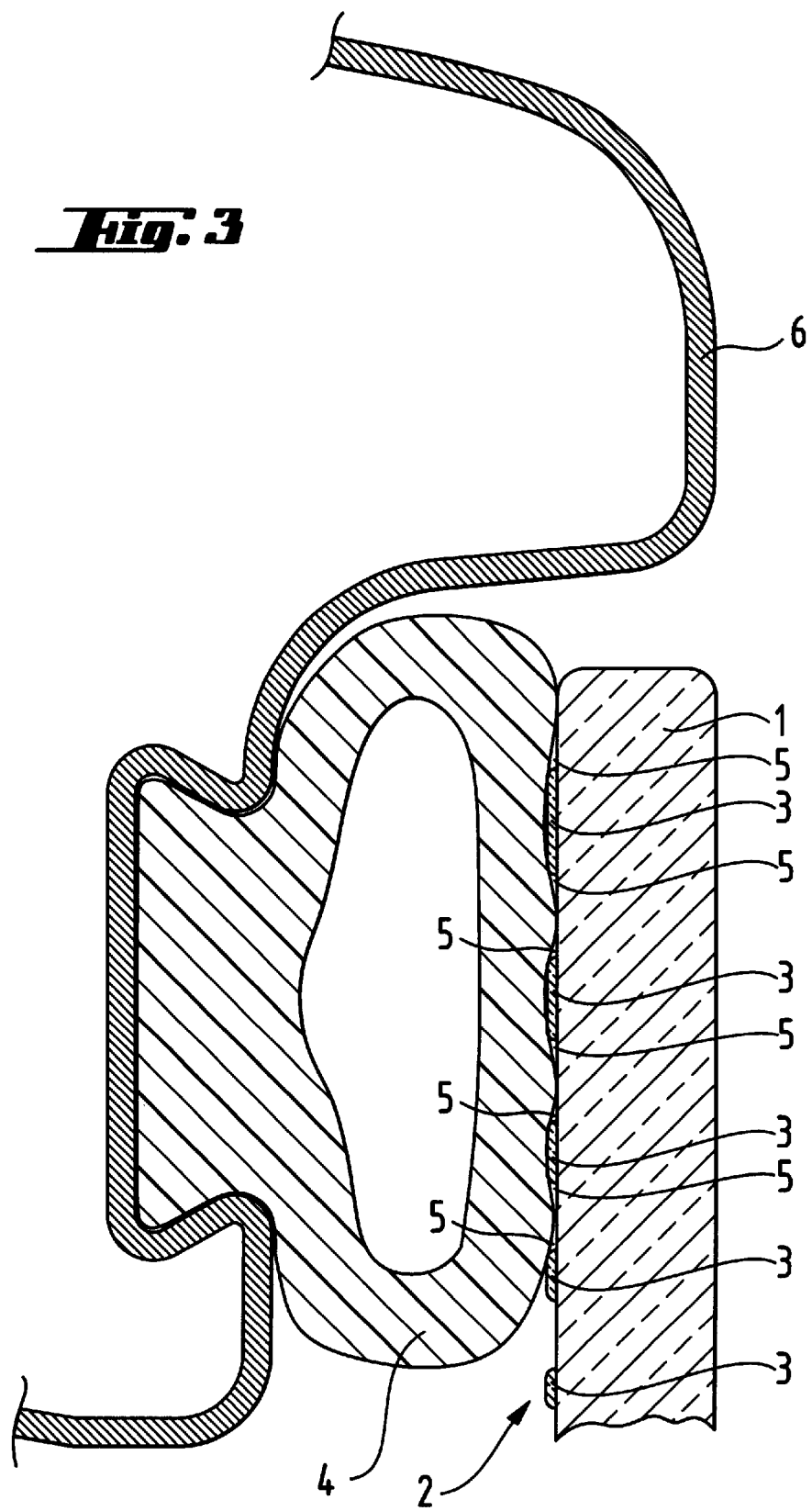

MOTOR-VEHICLE WINDOW WITH A STRUCTURED SURFACE IN THE PERIPHERAL REGION

BACKGROUND OF THE INVENTION

The present invention relates to a motor-vehicle window having a peripheral region which interacts, at least in places, with a sealing element. In this case, the motor-vehicle window can be fitted both in a fixed manner and in a moveable or sliding manner.

The sealing element must seal the window opening with respect to wind, rain and noise when the window is closed. The adhesion force between a moveable motor-vehicle window and the sealing element cannot be too high, so that the initial force needed to open and close the window is as low as possible.

However, too high an adhesion force can also cause grating and squeaking noise because of the relative movements between the motor-vehicle window and the sealing element. The noise is caused by self-excited frictional vibrations which are also known by the name "stick-slip effect" and occur when smooth surfaces, such as window panes, slide on elastic materials, such as seals. The relative movements are produced by body torsions, at high speed, by the action of suction at the motor-vehicle window or, in the case of moveable windows, by opening and closing them.

A sealing element covered with a coating which decreases the adhesion is described in document DE 3,435,469 A1. In order to manufacture it, a rubbery primer is applied to the surface of a rubber base and cured, and then a thermosetting polyurethane paint is applied to the surface of the primer.

Document DE 4,331,790 C2 describes a sealing element constructed in the form of a hollow profiled strip which is connected to an absorber or vibration damper so as to prevent the grating noise.

The manufacture of such sealing elements is relatively complex and, consequently, expensive and subject to defects.

SUMMARY OF THE INVENTION

The objective of the invention is to provide another means of avoiding excessively high adhesion forces and the production of noise by means of a simple sealing element.

This objective is achieved by the fact that the surface of the motor-vehicle window is, at least in the peripheral region of contact with the sealing element provided with a structure intended to create a large number of locally limited areas of contact between the sealing element and the motor-vehicle window.

According to the invention, the surface structure on the motor-vehicle window is preferably applied by screen printing, that is to say it is printed with a fireable ceramic paint which is then fired. It has been found that a pattern of dots is most effective as a surface structure for reducing the stiction. However, it is also possible to produce a suitable surface structure using other processes, in the form of impressions formed in the surface of the glass, for example by grinding, etching or laser machining.

Motor-vehicle windows which are printed in the peripheral region using an entirely impermeable opaque fireable ceramic paint are known in general, but the function of this printing is limited to the masking of fastening elements, to the protection of a bead of adhesive against UV radiation from the sun, or to purely decorative purposes.

The printing of a motor-vehicle window according to the invention using a structured fireable ceramic paint, preferably transparent, or the surface structure produced in the manner explained above, is not intended in this option. In the case of the structurization according to the invention of the surface of the coating or of the edge of the window, the friction between the window and the sealing element is reduced. This effect is probably due to the fact that the pressing forces acting normally flat against the entire contact area between the sealing element and the motor-vehicle window are distributed by the use according to the invention of a surface structure over a large number of locally limited contact areas, The resilient sealing element will directly follow the relative movements with respect to the glass only in some areas, namely on the said locally limited contact areas, and, firstly, will not provide resistance thereon with the rigidity of its entire volume. The creation of elastic tensile forces, the removal of which produces noise, is consequently prevented, or at least greatly reduced.

The large number of locally limited contact areas must, as above, ensure sufficient sealing of the interstice between the window pane and the seal, for example by suitable staggering over the entire sealing region.

BRIEF DESCRIPTION OF THE DRAWINGS

The drawings show, diagrammatically:

FIG. 3: a cross-sectional view corresponding to FIG. 2, so as to make the interaction between the sealing element and the window pane more apparent.

The motor-vehicle window according to the invention has the advantage that its surface structure can be produced using known and approved processes, for example by screen printing. Screen-printing equipment is usually available in motor-vehicle window manufacturing lines so that additional investment is unnecessary. The expensive measures taken in order to reduce stiction at the sealing elements may be completely or partially eliminated.

Printing in a pattern of dots has proved to be particularly advantageous when the ratio between the printed and unprinted areas is between 30% and 90%. The diameter of the dots distributed in several rows is between 0.3 and 5 mm. The expression "pattern of dots" should also be understood to mean pattern geornetries which do not comprise circular dots but, for example, square dots.

The printed structures have a thickness of approximately 10 $\mu$m to 35 $\mu$m. Consequently, it is guaranteed that the sealing element is able to come into direct contact with the window pane evenly between the various points, minute interstices appearing at the transitions between the printed and unprinted areas, these interstices interrupting the area of contact between the seal and the glass or the printing.

If the surface of the glass is itself structured in the manner described above, a depth of penetration corresponding to the thickness of the abovementioned structure is sufficient for the impressions.

Instead of a pattern of dots, it is, of course, also possible to apply a structure of lines. If required, so as to extend the effect according to the invention, the structure of lines has, for example, the shape of hatching oriented obliquely with respect to the direction of relative movement between the motor-vehicle window and the sealing element.

The desired surface structure used to divide the area of contact between the seal and the glazed surface can, in principle, also be obtained by sufficiently rough surface printing. Although known surface printing is also slightly rougher than the surface of the glass, it cannot, however, cause the effect according to the invention.

The optical perceptibility of the surface structure can, if required, be minimized by using highly transparent printing or a treatment giving a particularly high-quality surface finish to the impressions produced in the surface of the glass.

One embodiment of a motor-vehicle window according to the invention will be described in detail below with the aid of the drawings.

DETAILED DESCRIPTION OF THE INVENTION

Figure 1:
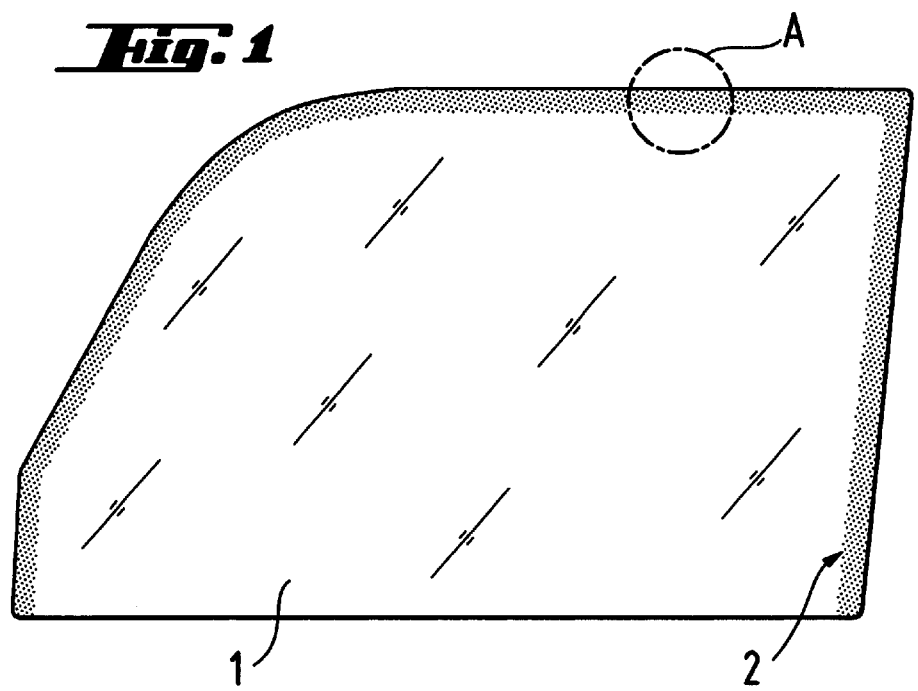
FIG. 1: a plan view of a motor-vehicle window according to the invention, having the shape of a manually operated window pane.

FIG. 1 shows a manually operated window pane 1, the peripheral regions at the side edges and at the top edge of which have a structurization 2 printed in the form of a pattern of dots 3. These regions come, at least partially, into contact with sealing elements.

Figure 2:
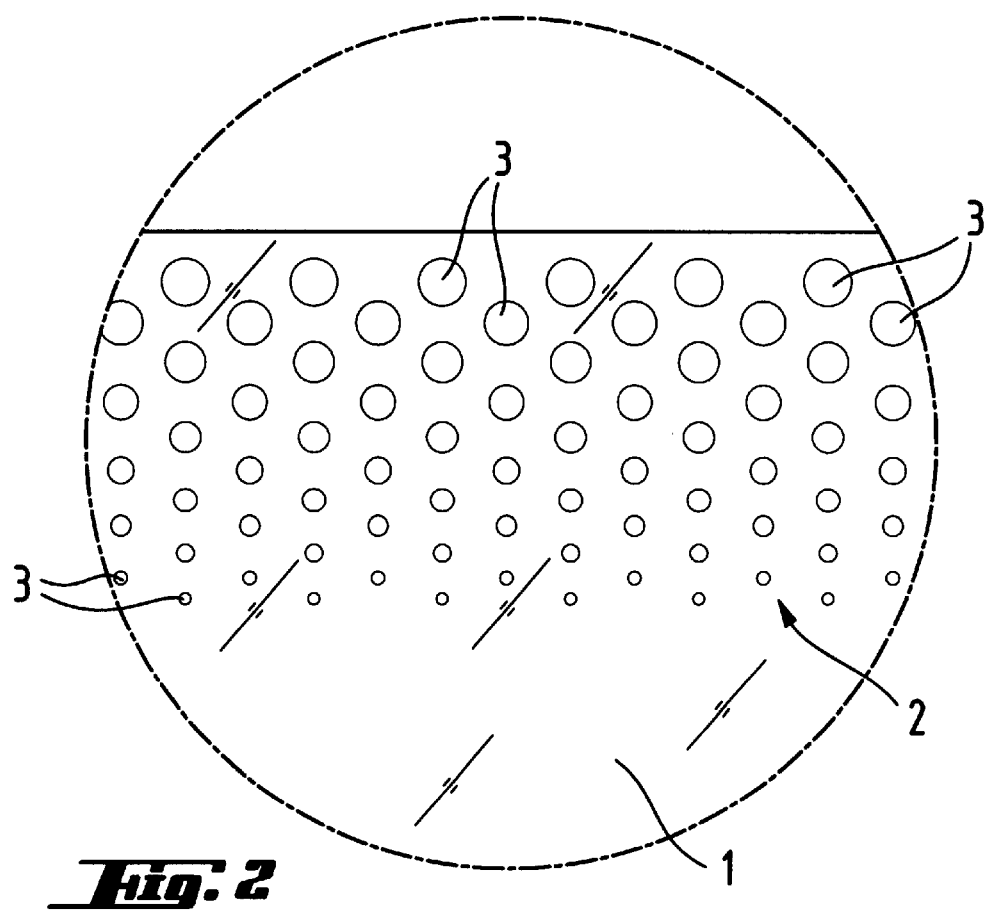
FIG. 2: a part A of FIG. 1, on a large scale.

FIG. 2 shows the part A in FIG. 1 on a larger scale. The dots 3 have been applied by screen printing and are composed of a pigment-free fireable ceramic paint, and therefore only of a flux, and are consequently transparent. The fireable ceramic paint is fired at temperatures of approximately 630° C. during the subsequent treatment of the manually operated window pane into a toughened safety glass. The flux used withstands the water of condensation. The pattern of dots chosen varies, having smaller and smaller dots on going towards the middle of the window pane.

FIG. 3 shows, in cross section, the interaction of a sealing element with the structurization 2, which forms the surface structure on the manually operated window pane 1. The sealing element 4 is fastened to the body 6 of the vehicle via an interlocking connection. It should be noted that the resilient sealing element 4 is in contact with the manually operated window pane 1 both at the printed and fired transparent dots 3 of the surface structure 2 and in the regions lying between the dots 3. Small interstices 5 create discontinuous surfaces. In this way, the resilient sealing element 4 contributes only in some regions, by stiction, to the relative movements in the contact area. Consequently, the compressive forces are distributed unevenly over the overlapping surfaces of the manually operated window pane 1 and the sealing element 4. A "stick-slip" effect does not occur, that is to say the self-excited frictional vibrations produced by the creation of elastic tensile forces, the removal of which produces undesirable noise, is completely eliminated or at least greatly reduced.

What is claimed is:

1. Motor-vehicle window having a peripheral region which engages, at least in places, with a sealing element, characterized in that the surface of the motor-vehicle window (1) is provided, at least in the peripheral region of contact with the sealing element (4), with a structurization (2) so as to establish a number of locally limited areas of contact between the sealing element (4) and the motor-vehicle window (1) to reduce friction between the motor-vehicle window (1) and the sealing element (4), thus, reducing adhesion forces between the window and sealing element to reduce noise during relative movement between the window and the sealing element.

2. Motor-vehicle window according to claim 1, characterized in that the structurization (2) consists of a fireable ceramic paint, which is preferably transparent.

3. Motor-vehicle window according to claim 1 or 2, characterized in that the structurization (2) is produced using a printing material applied by screen printing.

4. Motor-vehicle window according to claim 1, characterized in that the structurization (2) consists of impressions formed in the surface of the motor-vehicle window.

5. Motor-vehicle window according to claim 1, characterized in that the structurization (2) consists of a pattern of dots (3).

6. Motor-vehicle window according to claim 1, characterized in that the structurization consists of a structure of lines.

7. Motor-vehicle window according to claim 5, characterized in that said dots have a diameter between 0.3 and 5 mm.

8. Motor-vehicle window according to claim 7, characterized in that said peripheral region extends from an edge of said window toward a central portion of the window and said dots vary in diameter with dots of larger diameter adjacent said edge.

9. Motor-vehicle window according to claim 5, characterized in that said dots have a thickness of between about 10 $\mu$m and 35 $\mu$m and are spaced from each other to define intertices and a discontinuous surface.

10. The motor-vehicle window of claim 5, wherein the ratio of printed area to unprinted area in the pattern of dots is between 30 and 90 percent.

* * * * *

UNITED STATES PATENT AND TRADEMARK OFFICE
CERTIFICATE OF CORRECTION

PATENT NO.    : 6,253,506 B1
DATED         : July 3, 2001
INVENTOR(S)   : Dieter Hahn It is certified that error appears in the above-identified patent and that said Letters Patent is hereby corrected as shown below:

<u>Title page,</u>
ABSTRACT,
Line 1, replace the term "leas" with the word -- least --.

<u>Claim 8,</u>
Line 4, insert the word -- to -- between the words "adjacent" and "edge".

Signed and Sealed this

Fifteenth Day of January, 2002

Attest:

JAMES E. ROGAN
Attesting Officer    Director of the United States Patent and Trademark Office